(12) United States Patent
Wu et al.

(10) Patent No.: US 11,235,999 B2
(45) Date of Patent: Feb. 1, 2022

(54) WATER TREATMENT SYSTEM

(71) Applicant: Access Business Group International LLC, Ada, MI (US)

(72) Inventors: Ziqi Wu, Grand Rapids, MI (US); Karlis Vecziedins, Caledonia, MI (US); Shih-Yi Chang, Shenzhen (CN); Tianxiong Zeng, Shenzhen (CN); Terry L Lautzenheiser, Nunica, MI (US); Daniel L. Schlenk, Grand Rapids, MI (US); Bradley J. Pippel, Grandville, MI (US)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 17/078,582

(22) Filed: Oct. 23, 2020

(65) Prior Publication Data

US 2021/0171384 A1    Jun. 10, 2021

(30) Foreign Application Priority Data

Dec. 6, 2019    (CN) .......................... 201911241711.7

(51) Int. Cl.
   *C02F 9/00*    (2006.01)
   *C02F 1/00*    (2006.01)
   *C02F 1/32*    (2006.01)

(52) U.S. Cl.
   CPC .............. *C02F 9/005* (2013.01); *C02F 1/003* (2013.01); *C02F 1/32* (2013.01); *C02F 2201/004* (2013.01); *C02F 2201/3222* (2013.01); *C02F 2307/02* (2013.01)

(58) Field of Classification Search
   CPC ...... C02F 1/003; C02F 1/32; C02F 2201/004; C02F 2201/3222; C02F 2307/04; C02F 9/005; C02F 2307/02; A45F 2003/163
   See application file for complete search history.

(56) References Cited

U.S. PATENT DOCUMENTS

| 6,136,188 | A  | 10/2000 | Rajan et al. |
| 6,224,764 | B1 | 5/2001  | Matyushin et al. |
| 7,306,716 | B2 | 12/2007 | Baarman |
| 8,097,159 | B1 | 1/2012  | Peng |

(Continued)

FOREIGN PATENT DOCUMENTS

| CN | 201436055 | 4/2010 |
| CN | 102070257 | 5/2011 |

(Continued)

OTHER PUBLICATIONS

International Search Report and Written Opinion of the International Searching Authority for International Application No. PCT/US2019/050285 dated Oct. 31, 2019.

*Primary Examiner* — Terry K Cecil
(74) *Attorney, Agent, or Firm* — Warner Norcross + Judd LLP

(57) ABSTRACT

A water treatment system is provided with an untreated water reservoir having a cavity through which a filter assembly may traverse such that untreated water in the cavity passes through the filter assembly into a treated water reservoir. Removal of the filter assembly may be facilitated by a seal disengagement element operable to unseat a seal formed during efforts to direct untreated water through the filter assembly.

19 Claims, 18 Drawing Sheets

(56) References Cited

U.S. PATENT DOCUMENTS

| | | |
|---|---|---|
| 8,128,820 B2 | 3/2012 | Wu |
| 8,177,966 B2 | 5/2012 | Wu |
| 8,216,462 B2 | 7/2012 | O'Brien et al. |
| 8,313,644 B2 | 11/2012 | Harris et al. |
| 8,318,011 B2 | 11/2012 | O'Brien et al. |
| 8,394,268 B2 | 3/2013 | O'Brien et al. |
| 8,425,771 B2 | 4/2013 | O'Brien et al. |
| 8,816,300 B1 | 8/2014 | Walker et al. |
| 8,852,439 B2 | 10/2014 | Frauchiger et al. |
| D729,584 S | 5/2015 | Weston et al. |
| 9,212,067 B2* | 12/2015 | Gellibolian ............ C02F 1/002 |
| 9,517,948 B1 | 12/2016 | Garrett |
| 9,796,600 B2 | 10/2017 | Shotey et al. |
| 9,828,273 B2 | 11/2017 | Barlow |
| 9,873,627 B1 | 1/2018 | Barlow |
| 10,710,007 B2* | 7/2020 | Weston .................. B01D 33/01 |
| 2006/0163169 A1 | 7/2006 | Eckhardt et al. |
| 2007/0284300 A1* | 12/2007 | Bidlingmeyer ......... B01L 3/502 210/450 |
| 2009/0314703 A1 | 12/2009 | Beach et al. |
| 2010/0032353 A1 | 2/2010 | Frandsen |
| 2010/0032358 A1 | 2/2010 | Vestergaard Frandsen |
| 2014/0008310 A1 | 1/2014 | Weston et al. |
| 2014/0008311 A1 | 1/2014 | Weston et al. |
| 2014/0197082 A1 | 7/2014 | Weston et al. |
| 2017/0066659 A1 | 3/2017 | Sun |
| 2018/0118597 A1 | 5/2018 | Bechtold |
| 2020/0282344 A1* | 9/2020 | Merrigan ............... B01D 27/08 |

FOREIGN PATENT DOCUMENTS

| | | |
|---|---|---|
| CN | 108265784 | 7/2018 |
| JP | H11-290838 | 10/1999 |
| KR | 10-0453024 | 10/2004 |
| KR | 2011-0003101 | 1/2011 |
| KR | 2011-0133745 | 12/2011 |
| KR | 10-1597345 | 2/2016 |

* cited by examiner

WATER TREATMENT SYSTEM

FIELD OF THE INVENTION

The present application relates to an apparatus for filtering water and a method thereof, and more particularly to portable filtration applications.

BACKGROUND

As people move about during their daily activities, access to a trusted clean water source due to where the water originates and how it is supplied by various municipalities can present uncertainties in whether the water is clean for a user. In many cases, any time a user travels away from a trusted clean water source, these issues can arise.

Today, as people move through their daily activities, they often carry water from a known clean water source (e.g., from home or a trusted source) for personal consumption, or they stop and purchase bottled water from a trusted provider. When people are traveling in parts of the world where the municipal water supply is known or considered to have contaminants or high levels of bacteria, viruses, or protozoan cysts, or a combination thereof, they are often forced to rely on bottled water or packaged soft drinks for hydration.

In many instances, there is no access to a trusted source of clean water or bottled water. As a result, a person may ultimately drink municipality water, potentially risking exposure to gastrointestinal and stomach illnesses like nausea, vomiting, cramps, and diarrhea. This issue can become increasingly prevalent in locations around the world where the municipal water is known to cause stomach upset and access to bottled water is limited.

SUMMARY

The present disclosure relates to a portable water treatment system that purifies and disinfects water for personal hydration. A water treatment system may be provided with an untreated water reservoir having a cavity through which a treated water reservoir may traverse. The treated water reservoir may include a filter assembly configured to pass through untreated water in the cavity of the untreated water reservoir and to discharge treated water into a cavity of the treated water reservoir. A seal may be provided between an inner surface of the untreated water reservoir and an outer surface of the treated water reservoir, and configured to prevent water leakage therebetween and facilitate directing water through the filter assembly of the treated water reservoir as the filter assembly passes through the untreated water in the cavity of the untreated water reservoir. A seal release element may be provided to engage and unseat the seal in response to removal of the treated water reservoir from the untreated water reservoir.

In one embodiment, a water treatment system is provided with an untreated water reservoir, and a main body having a filter assembly and a treated water reservoir. The water treatment system may include a wiping seal interface.

The untreated water reservoir may include a cavity capable of holding untreated water, and the filter assembly may be adapted to be disposed within the cavity of the untreated water reservoir. The filter assembly may include an inlet configured to be fluidly coupled with the cavity to receive the untreated water, and an outlet configured to discharge treated water.

The treated water reservoir may be configured to store treated water discharged from the filter assembly, and may include a first end opening and second end opening. The second end opening of the treated water reservoir may be fluidly coupled with the outlet of the filter assembly.

The wiping seal interface may include a seal between a seal engagement surface of the main body and an inner surface of the untreated water reservoir. The seal of the wiping seal interface may provide a substantially air and water tight seal between an environment and the cavity of the untreated water reservoir. In one embodiment, displacing the main body into the cavity of the untreated water reservoir directs the untreated water through the filter assembly into the treated water reservoir, where the wiping seal interface includes a seal disengagement element operable to unseat the seal to break the air and water tight seal based on movement of the main body out of the cavity of the untreated water reservoir.

In one embodiment, a water treatment system is provided with an untreated water reservoir, a filter assembly, a treated water reservoir, a wiping seal interface, and a cap. The untreated water reservoir may include a cavity capable of holding untreated water, and the filter assembly may be adapted to fit within the cavity of the untreated water reservoir. The filter assembly may include an inlet configured to be fluidly coupled with the cavity to receive the untreated water, and an outlet configured to discharge treated water.

The treated water reservoir may be configured to store treated water, and may be fluidly coupled with the outlet of the filter assembly. The wiping seal interface may be operable to facilitate generating a pressure differential to direct untreated water through the filter assembly.

The cap may include a spout for discharging the treated water stored in the treated water reservoir for consumption by a user. An air passage may be provided to a surrounding environment, such that the air passage and the wiping seal interface are configured to facilitate generation of the pressure differential between the untreated water reservoir and the treated water reservoir to direct the untreated water in the cavity of the untreated water reservoir through the filter assembly to the treated water reservoir.

The wiping seal interface may be operable to break a seal between the surrounding environment and the cavity of the untreated water reservoir to facilitate removal of the filter assembly and the treated water reservoir from the cavity of the untreated water reservoir.

In one embodiment, a water treatment system is provided with an untreated water reservoir and a main body. The untreated water reservoir may include a cavity capable of holding untreated water. The main body may include a filter assembly, a treated water reservoir, and a cap. The filter assembly may be adapted to fit within the cavity of the untreated water reservoir. The filter assembly may include an inlet configured to be fluidly coupled with the cavity to receive the untreated water, and an outlet configured to discharge treated water.

The treated water reservoir may be configured to store treated water, and may be fluidly coupled with the outlet of the filter assembly.

The cap may include a spout for discharging the treated water stored in the treated water reservoir for consumption by a user, and a UV treatment assembly with a UV light source for disinfecting water.

The wiping seal interface may be provided between the main body and an inner surface of the untreated water reservoir. The wiping seal interface may be operable to provide an air and water tight seal between a surrounding environment and the cavity of the untreated water reservoir. In one embodiment, the wiping seal interface may include a seal disengagement element operable to break the air and water tight seal based on longitudinal movement of the filter assembly relative to the untreated water reservoir.

The untreated water reservoir may be configured to receive at least a portion of the main body within the cavity of the untreated water reservoir, and the untreated water in the untreated water reservoir passes through the filter assembly into the treated water reservoir to allow displacement of the main body into the cavity of the untreated water reservoir.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

Figure 1:
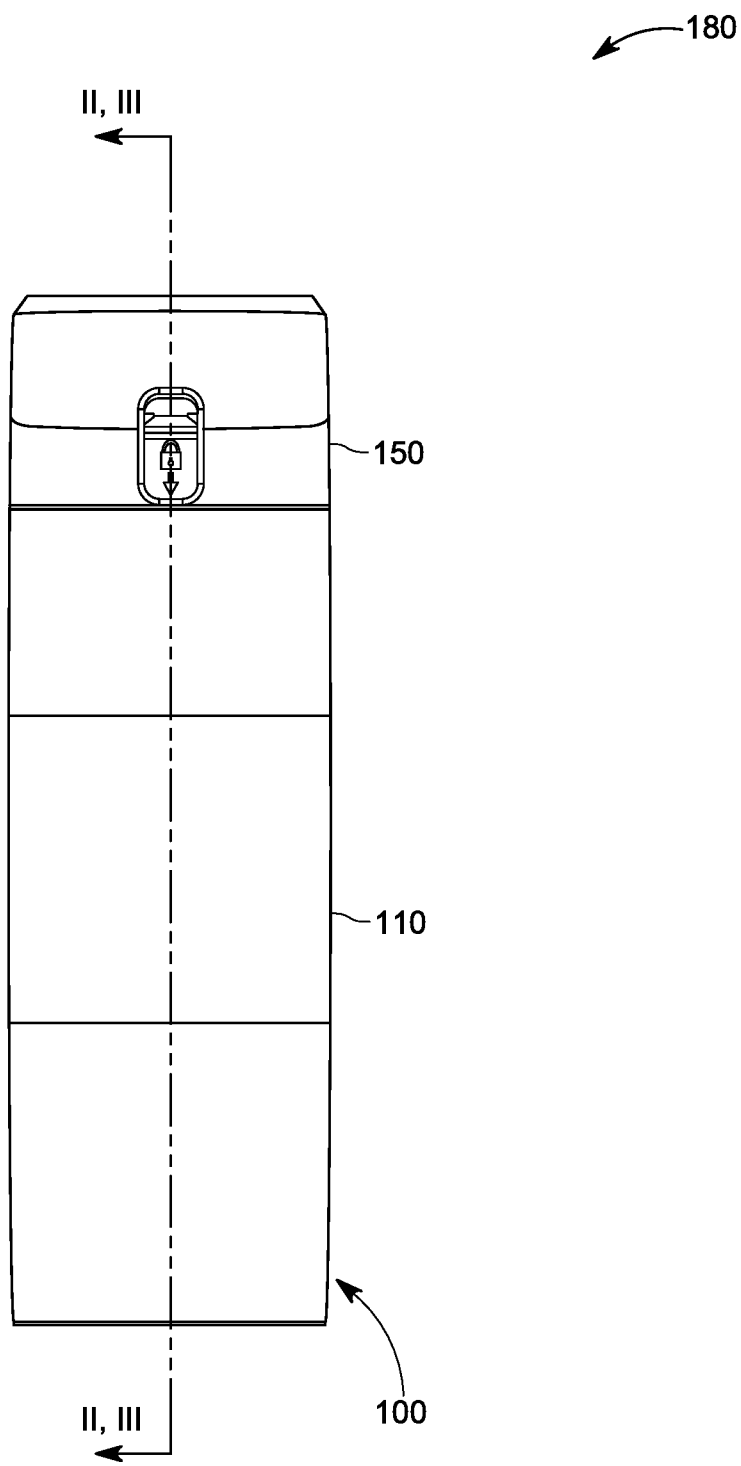
FIG. 1 shows a front view of a water treatment system in accordance with one embodiment.
Figure 2:
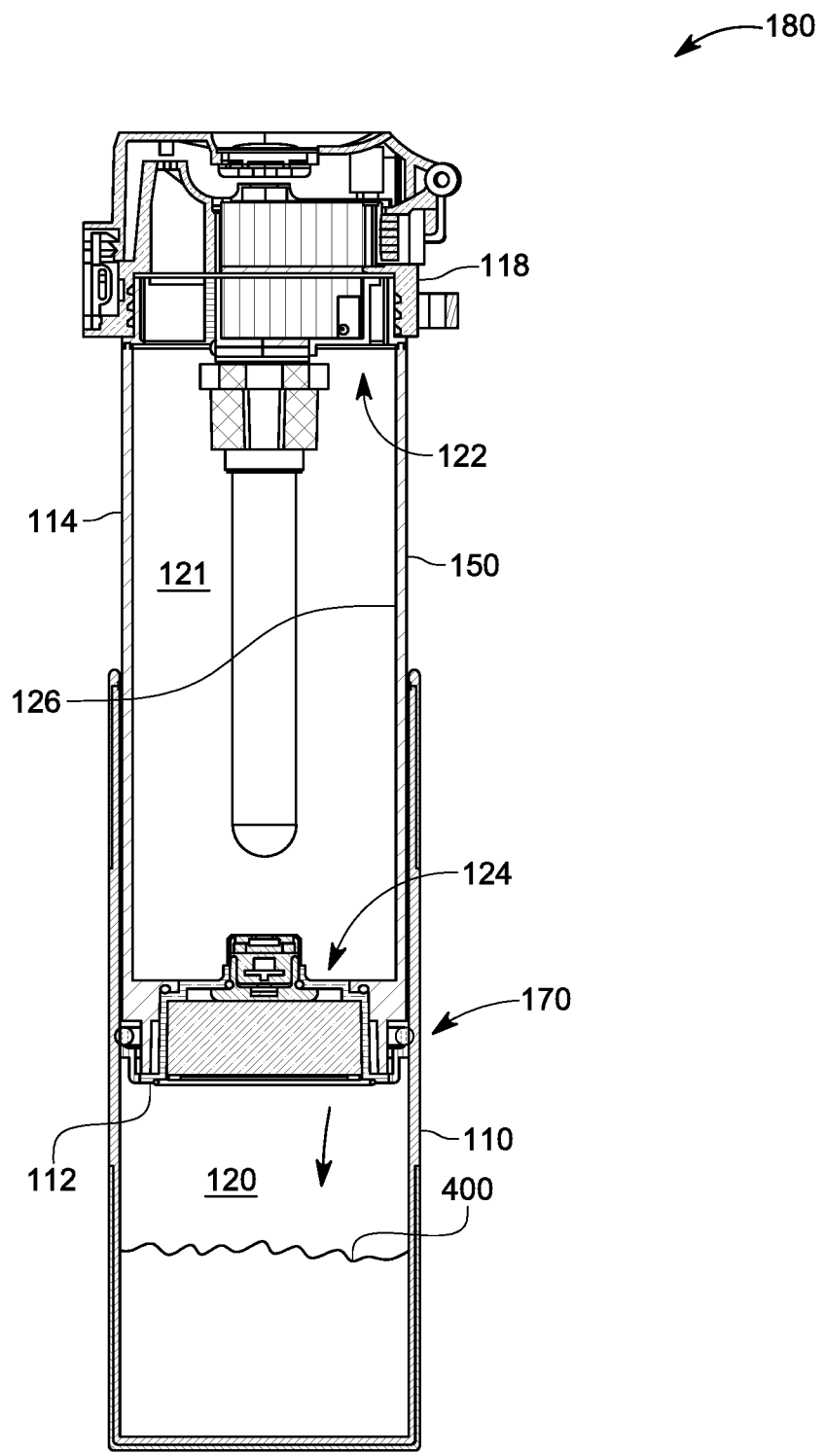
FIG. 2 shows a sectional view of FIG. 1 with a main body partially received within an untreated water reservoir.
Figure 3:
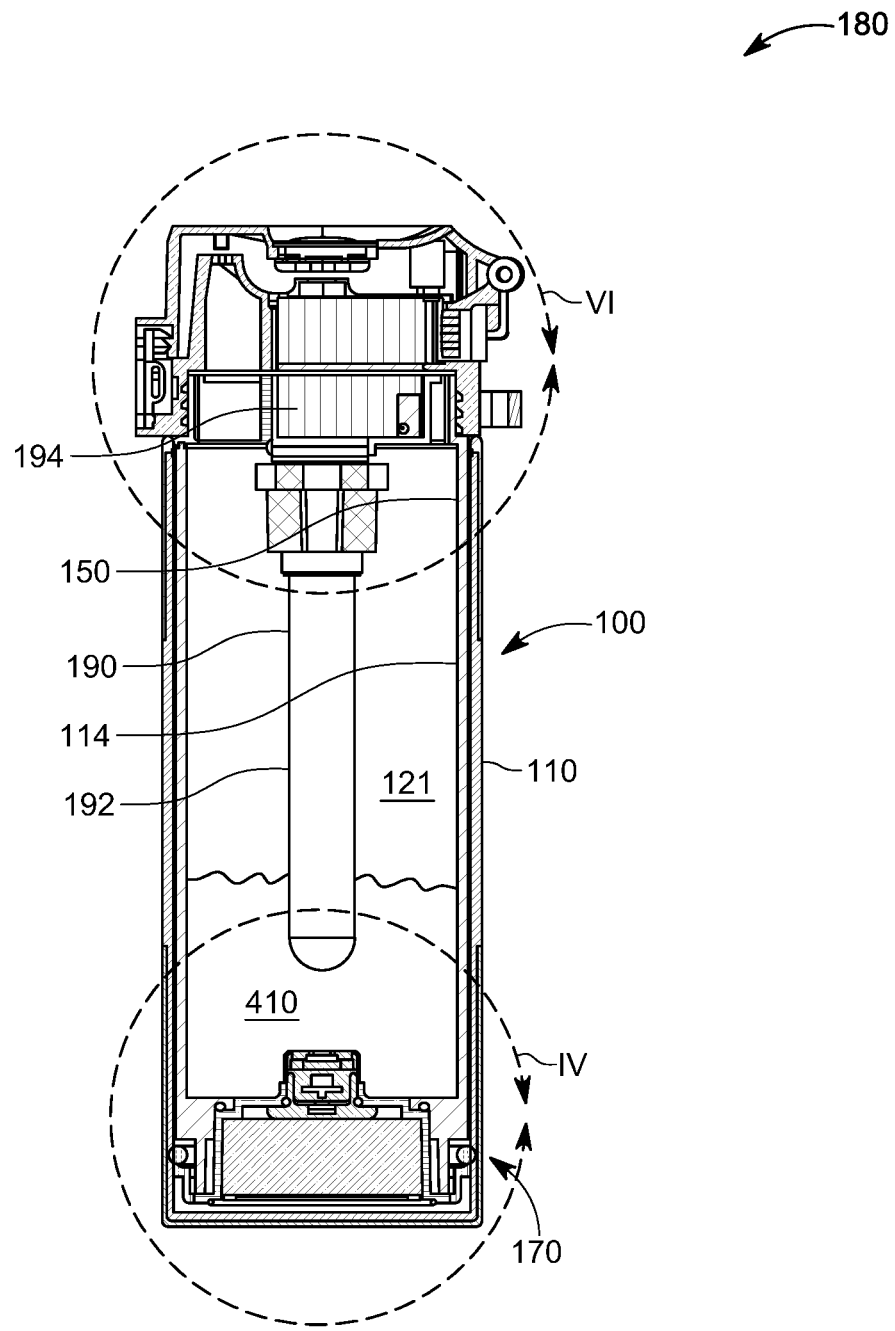
FIG. 3 shows a sectional view of FIG. 1 with a main body fully received within an untreated water reservoir.

A water treatment system in accordance with one embodiment is shown in FIGS. 1-6 and generally designated 100. The water treatment system 100 may be configured as a portable system capable of treating untreated water. In the illustrated embodiment, the water treatment system 100 may include an untreated water reservoir with a cavity through which a filter assembly of a main body may traverse such that untreated water in the cavity passes through the filter assembly into a cavity of a treated water reservoir. The filter assembly may form part of a main body that operates as a plunger assembly that can traverse through the cavity of the untreated water reservoir.

In the illustrated embodiment, the main body or plunger assembly may include a wiping seal that is capable of engaging an inner surface of the untreated water reservoir and that enables directing untreated water into the cavity of the untreated water reservoir. The wiping seal interface may be disposed between an outer surface of the main body and an inner surface of the untreated water reservoir to form a seal between the cavity of the untreated water reservoir and the surrounding atmosphere. With the wiping seal interface forming such a seal, application of force to the main body to push the main body into the untreated water reservoir may cause untreated water in the untreated water reservoir to pass through the filter assembly to the treated water reservoir. In other words, displacement of the main body into the cavity of the untreated water reservoir, in conjunction with the wiping seal, may force untreated water through the filter assembly into a cavity of the treated water reservoir. A cap for the main body may include an air passage operable to discharge air in the head space of the cavity of the treated water reservoir to allow water to flow into the cavity of the treated water reservoir in response to plunging the main body into the cavity of the untreated water reservoir.

In one embodiment, a water treatment system is provided that is configured to treat water using a French press design in conjunction with a filter media. The system may use an incorporated pump method (e.g., a french press or plunger based system) to push water from an untreated vessel to a UV treatment vessel in a personal form factor that can appear similar to a water bottle. A "pry" feature may allow a user to separate inner and outer vessels.

In one embodiment, an unfiltered water source (e.g., tap water) is filled into an outer bottle as a primary chamber (e.g., an untreated water reservoir). An inner bottle combined with a filter housing and O-ring seals act as a secondary chamber (e.g., a treated water reservoir). During push action between the primary and secondary chambers (e.g., plunging the treated water reservoir into the untreated water reservoir), influent water is forced to pass through the filter media to achieve filtration. As a result, the air inside the inner bottle is forced to exit to the atmosphere from a cap. A main O-ring may serve as a seal to prevent the influent water spilling out from the gap between the inner bottle and outer bottle during push-down action. One or more additional O-rings may serve as seals to prevent influent water bypassing the filter media before entering the inner bottle. In one embodiment, only filtered water can enter the inner bottle.

A one-way check valve may be disposed between the filter housing and inner bottle. In one embodiment, the one-way check valve may only allow water to enter the inner bottle in a single direction, substantially preventing backflow. During push-down action, the main O-ring is rested against the top surface (e.g., a seal engagement surface of the treated water reservoir) of the empty compartment between the inner bottle and filter housing. The empty compartment may correspond to a space in which the main O-ring is allowed to move.

During pull-out action, the check valve may substantially prevent water leak out from the inner bottle. The main O-ring is rested against the bottom surface of the empty compartment between the inner bottle and filter housing. This bottom surface may correspond to a portion of a seal disengagement element. During pull-out, a "pry" feature of the seal disengagement element provided on the filter housing may deform the main O-ring and create a gap to allow air from the atmosphere to enter the bottom chamber of the outer bottle to avoid creating a vacuum space. This pry feature may allow a user to easily pull out the inner bottle in order to separate it from the outer bottle.

I. Overview

The water treatment system 100 in the illustrated embodiment of FIGS. 1-10 includes a main body 150 and an untreated water reservoir 110 (e.g., a bottle or receiver) having an opening 113 and a cavity 120 capable of receiving untreated water 400 from a water source. Components of the water treatment system 100 are shown in a disassembled state in the FIGS. 11-14. The untreated water reservoir 110 may be formed of any type of material, but in the illustrated embodiment, the untreated water reservoir 110 is formed of ABS via injection molding. Additional example materials include metals (e.g., aluminum or stainless steel), glass, or plastics other than ABS (e.g., polypropylene), or any combination thereof.

The main body 150 of the water treatment system 100 may include a filter assembly 112, a treated water reservoir 114, and a cap assembly 118. The treated water reservoir 114 in the illustrated embodiment may include a hollow cylinder 126 with a first end opening 122 and a second end opening 124, defining a cavity 121 capable of receiving treated water. The hollow cylinder 126 is shown in further detail in the illustrated embodiments of FIGS. 20-24 with the first and second end openings 122, 124 and the cavity 121. In the illustrated embodiment, the hollow cylinder 126 is circular; however, the present disclosure is not so limited. For instance, the cylinder may be square or any type of curved or polygon-shaped cylinder, or a cylinder having a cross-section defined by any combination of curves and lines.

The filter assembly 112 in one embodiment may include a treated water outlet 140 configured to discharge treated water into the second end opening 124. For instance, the treated water outlet 140 of the filter assembly 112 as depicted in FIGS. 1-6 may couple to the second end opening 124 of the treated water reservoir 114. The cap assembly 118 may couple to the first end opening 122 of the treated water reservoir 114. In this arrangement, with the cap assembly 118 coupled to the first end opening 122 and the filter assembly 112 coupled to the second end opening 124, the cavity 121 of the treated water reservoir 114 may hold treated water without substantial spillage.

Figure 4:
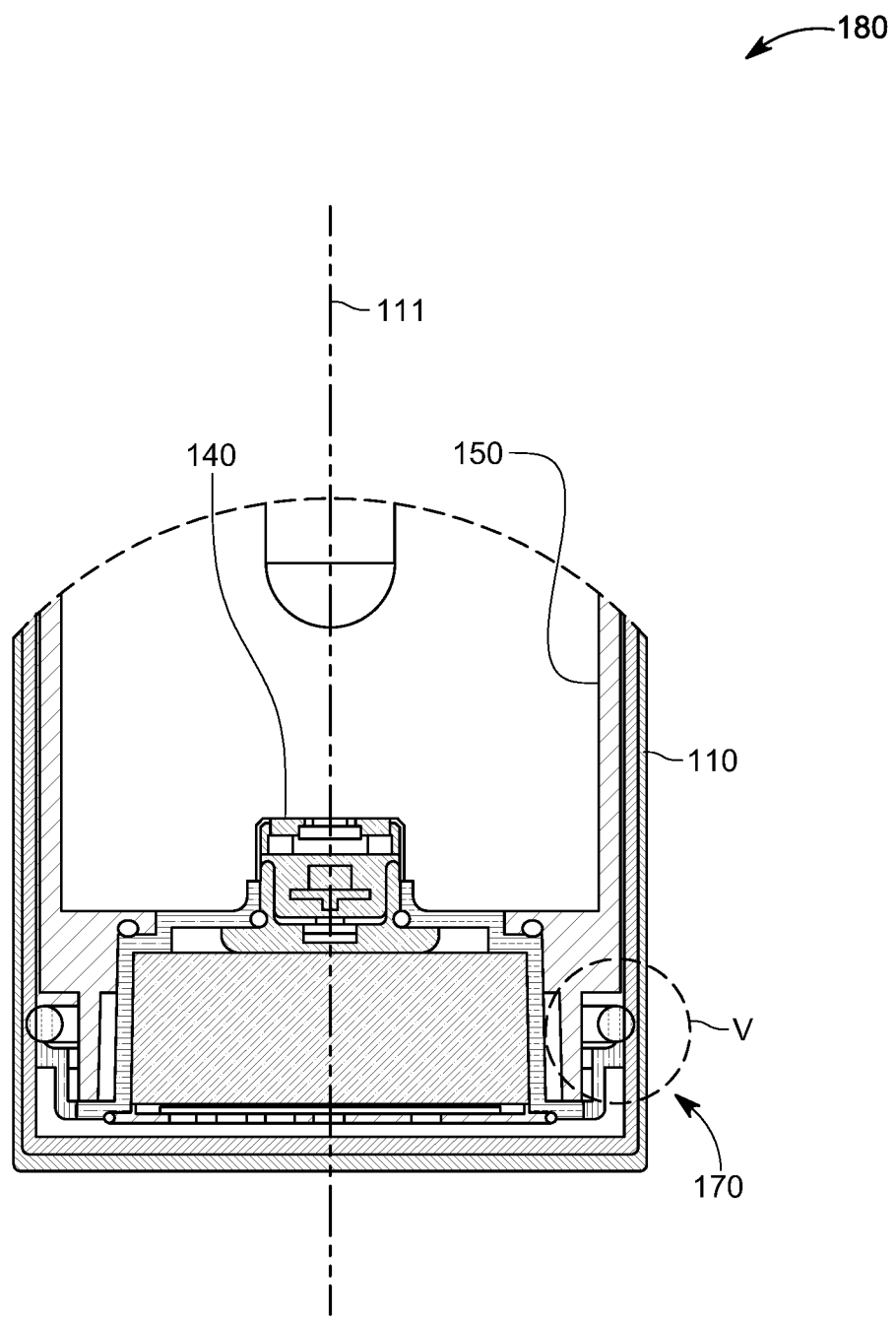
FIG. 4 shows an enlarged view of FIG. 3.
Figure 5:
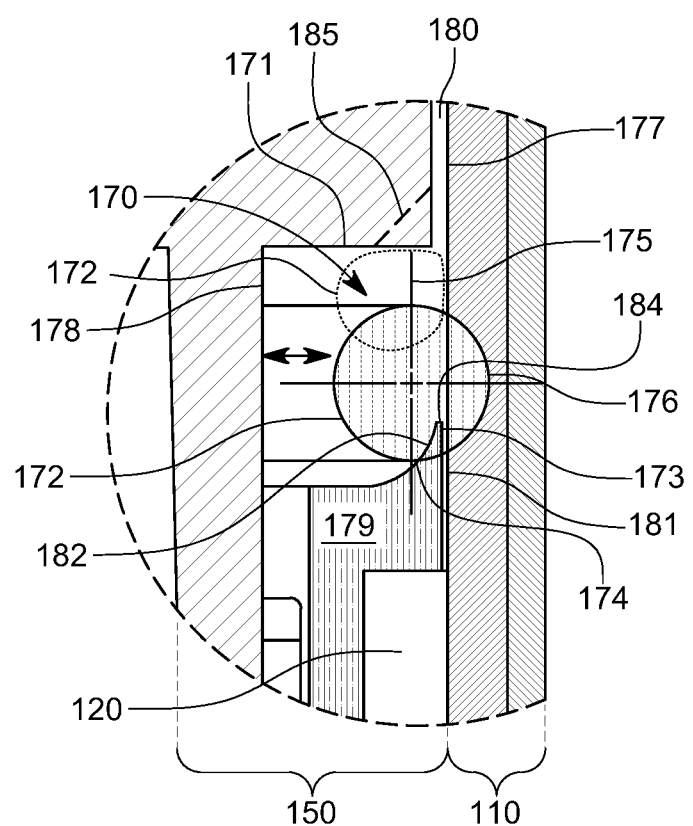
FIG. 5 shows an enlarged view of FIG. 4.

In the illustrated embodiment, the main body 150 includes a wiping seal interface 170 shown in enlarged views in FIGS. 4 and 5. The wiping seal interface 170 facilitates providing a seal between a surrounding environment 180 and the cavity 120 of the untreated water reservoir 110. The wiping seal interface 170 may prevent leakage of untreated water from the cavity 120 into the surrounding environment 180 in response to plunging the main body 150 into the cavity 120. Instead, untreated water in the cavity 120 may be directed through the filter assembly 112 into the cavity 121 of the treated water reservoir 114. The wiping seal interface 170 in conjunction with force applied to the main body 150 may pressurize the cavity 120 of the untreated water reservoir 110, thereby forcing the untreated water through the filter assembly 112 into the cavity 121 of the treated water reservoir 114. The treated water reservoir 114, as described herein, may be in fluid and/or gaseous communication with an air passage of the cap assembly 118 in order to allow the pressure to be formed at least in part by the wiping seal interface 170 to direct the untreated water through the filter assembly 112 into the treated water reservoir 114. The main body 150, in response to application of force to plunge the main body 150 into the cavity 121, may display to fill a void left by transfer of the untreated water 400 into the treated water reservoir 114.

In the illustrated embodiment of FIG. 5, the wiping seal interface 170 may include a seal 172 operable to engage an inner surface 177 of the untreated water reservoir 110, as shown in phantom lines in FIG. 5. The seal 172 may also engage an outer surface or seal engagement surface 171 of the main body 150 to form a water and gas tight seal between the main body 150 and the untreated water reservoir 110. For purposes of disclosure, the seal 172 shown in the illustrated embodiment mechanically overlaps the wall of the untreated water reservoir 110 in order to depict a size of the seal 172 as being sufficiently large in diameter to engage the inner surface 177 in compression. In practice, the seal 172 may be compressed such that the surface of the seal 172 engages the inner surface 177 and is not joined with the wall of the untreated water reservoir 110. For instance, the seal 172 is shown in a compressed configuration engaging both the seal engagement surface 171 and the inner surface 177 to form a seal between the untreated water reservoir 110 and the main body 150.

It is noted that the seal 172 is described in conjunction with the wiping seal interface 170. However it is to be understood that the present disclosure is not the limited. The wiping seal interface 170 may be replaced with a non-wiping seal interface including similar components, such as the seal 172 and a peel away element described herein operable to unseat the seal 172 to disengage a seal between the untreated water reservoir 110 and the main body 150.

In the illustrated embodiment, as described herein, the wiping seal interface 170 includes a seal disengagement element 174 operable to disengage a surface of the seal 172 from at least one of the main body 150 and the untreated water reservoir 110. For instance, the seal disengagement element 174 may engage a surface of the seal 172 that is proximal to the inner surface 177 to disengage the surface of the seal 172 from the inner surface 177. The seal disengagement element 174 may break, at least temporarily, the water and airtight seal between the seal 172 and at least one of the main body 150 in the untreated water reservoir 110, allowing removal of the main body 150 from the untreated water reservoir 110 without significant effort.

Optionally, the cap assembly 118 may include a pressure control assembly (not shown in FIG. 1) that is configured to produce a pressure differential between the cavity 121 of the treated water reservoir 114 and the cavity 120 of the untreated water reservoir 110 by generating a vacuum (relative to atmospheric pressure) in the cavity 121 of the treated water reservoir 114. In one embodiment, with the wiping seal interface 170 formed between the main body 150 and the inner surface 177 of the untreated water reservoir 110 (forming a seal from the surrounding environment 180), untreated water 400 in the untreated water reservoir 110 passes through the filter assembly 112 into the cavity 121 of the treated water reservoir 114 while the main body 150 displaces to fill a void left by transfer of the untreated water 400 in the untreated water reservoir 110. An example of vacuum assisted insertion of the main body 150 into the untreated water reservoir 110 is described in U.S. patent application Ser. No. 16/565,561, entitled WATER TREATMENT SYSTEM, filed Sep. 10, 2019, to Weber et al.—the disclosure of which is hereby incorporated by reference in its entirety.

In the one embodiment, the water treatment system 100 may be constructed such that the cap assembly 118 screws onto the top (e.g., the first end opening 122) of the treated water reservoir 114 (e.g., an inner sleeve). The filter assembly 112 (e.g., a carbon filter) may connect to the bottom (e.g., the second end opening 124) of the treated water reservoir 114 via twist lock connection. The main body 150 in an assembled form may then be placed on top of the untreated water reservoir 110 (e.g., an outer bottle), which is filled to an appropriate level with water to be treated. The main body 150 may be pushed through the untreated water 400 into the cavity 120 of the untreated water reservoir 110 using force applied by a person.

The treated water 410 in the treated water reservoir 114 in one embodiment may be disinfected by a UV disinfection system 190 of the cap assembly 118. The UV disinfection system 190 may include UV disinfection circuitry 194 operable to supply power from a power source of the UV disinfection circuitry 194 to a UV light source 192. The power source may be a rechargeable battery capable of being charged via a charge port provided in the cap assembly 118.

The UV light source 192, in one embodiment, may be a cold cathode UV lamp operable to supply UV light for disinfection of water within the cavity 121 of the treated water reservoir 114. Additionally, or alternatively, the UV light source 192 may include one or more UV light emitting diodes (LEDs) operable to supply UV light.

The UV disinfection circuitry 194 in one embodiment may include control circuitry operable to direct operation of the UV light source 192 in response to or based on one or more criteria. For instance, the control circuitry may be configured to activate the UV light source 192 for disinfection of water in the treated water reservoir 114 based on user input provided via a button 348 or selector on the cap assembly 118. Additionally, or alternatively, the UV disinfection circuitry 194 may be operable to activate the UV light source 192 in response to detecting the main body 150 has been inserted or plunged into the untreated water reservoir 110.

The UV disinfection circuitry 194 may be operable to supply power to the UV light source 192 for a period of time based on an amount of UV light dosage determined for disinfection of water. The UV disinfection circuitry 194 may additionally be operable to activate the UV light source 192 on a periodic basis based on an amount of dosage that has been applied to the water in the treated water reservoir 114. For instance, in one embodiment, the UV disinfection circuitry 194 may be operable to determine (by measurement or approximation) an amount of UV light dosage applied to water in the treated water reservoir 114. The influent and effluent flow rates may be determined in conjunction with an amount of dosage applied over a period of time associated with the influent and effluent flow rates to determine an amount of UV light dosage applied to the water present in the treated water reservoir 114, and to determine an amount of dosage and timing for such dosage with respect to the water present in the treated water reservoir 114.

The UV disinfection circuitry 194 may include any and all electrical circuitry and components to carry out the functions and algorithms described herein. Generally speaking, UV disinfection circuitry 194 may include one or more microcontrollers, microprocessors, and/or other programmable electronics that are programmed to carry out the functions described herein. The UV disinfection circuitry 194 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs), and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the water treatment system 100, or they may reside in a common location within the water treatment system 100. When physically distributed, the components may communicate using any suitable serial or parallel communication protocol, such as, but not limited to, CAN, LIN, FireWire, I2C, RS-232, RS-485, and Universal Serial Bus (USB).

In one embodiment, circuitry of the water treatment system 100 may be operable to communicate usage statistics and/or status information to an external device. As an example, the water treatment system 100 may be operable to sense an amount of water consumed over a given period, and to communicate this sensed information to an external device. The external device may be configured to provide hydration information and/or prompts to hydrate based on the information provided by the water treatment system 100.

In one embodiment, one or more portions of the treated water reservoir 114 and the untreated water reservoir 110 may be at least partially transmissive with respect to visible light. The UV light source described herein may generate both visible and UV light simultaneously, and the visible light may be seen through portions transmissive to visible light. This way, a user may be aware of UV disinfection progress or status.

In one embodiment, an internal surface of the treated water reservoir 114 that defines the cavity 121 may be reflective. For instance, the internal surface may be PTFE (e.g., Teflon) that is reflective with respect to UV light. This reflective property may promote UV light disinfection within the treated water reservoir 114.

II. Top Cap Assembly

Figure 6:
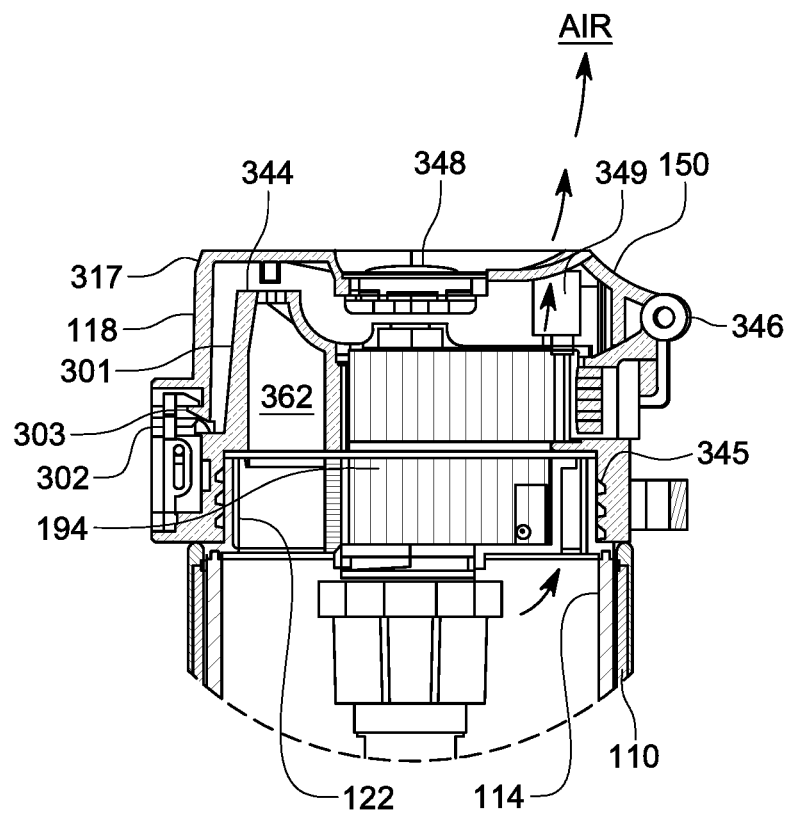
FIG. 6 shows an enlarged view of FIG. 3.
Figure 7:
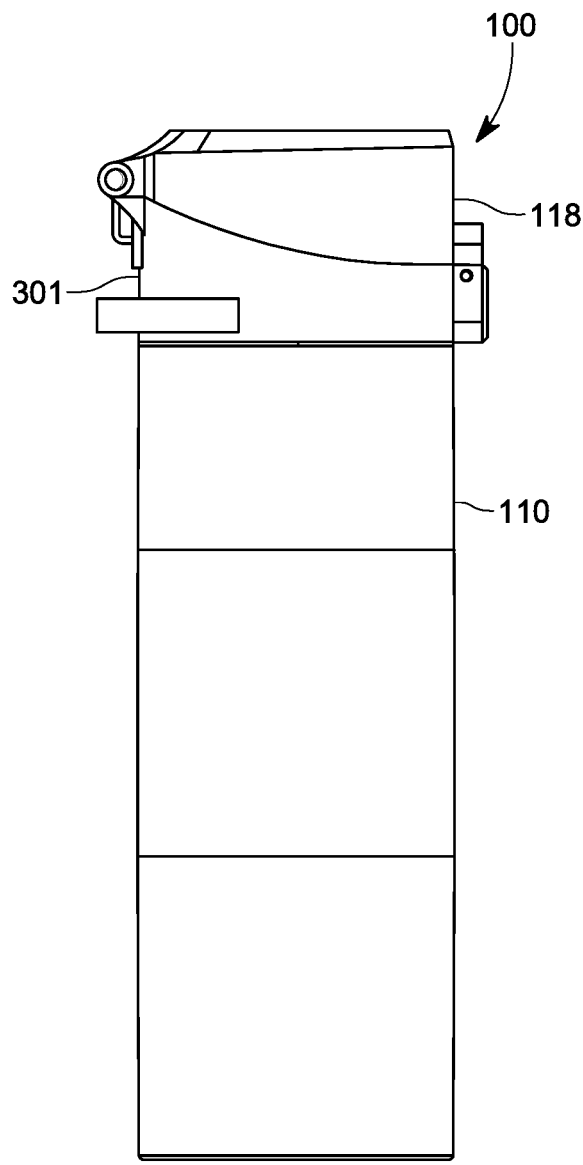
FIG. 7 shows a left side view of the water treatment system of FIG. 1.
Figure 8:
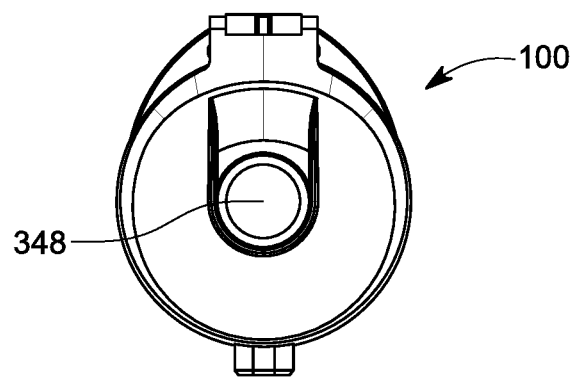
FIG. 8 shows a top view of the water treatment system of FIG. 1.
Figure 9:
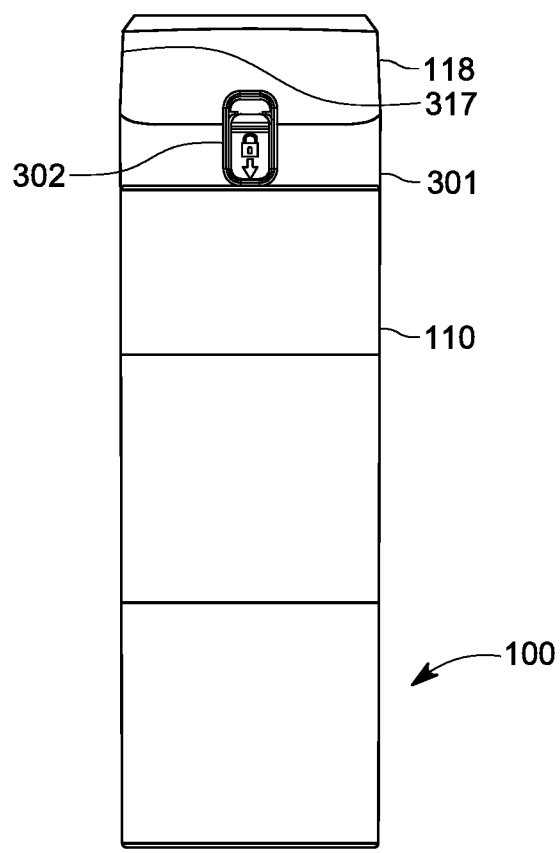
FIG. 9 shows a front view of the water treatment system of FIG. 1 relative to FIGS. 7, 8, and 10 for perspective.
Figure 10:
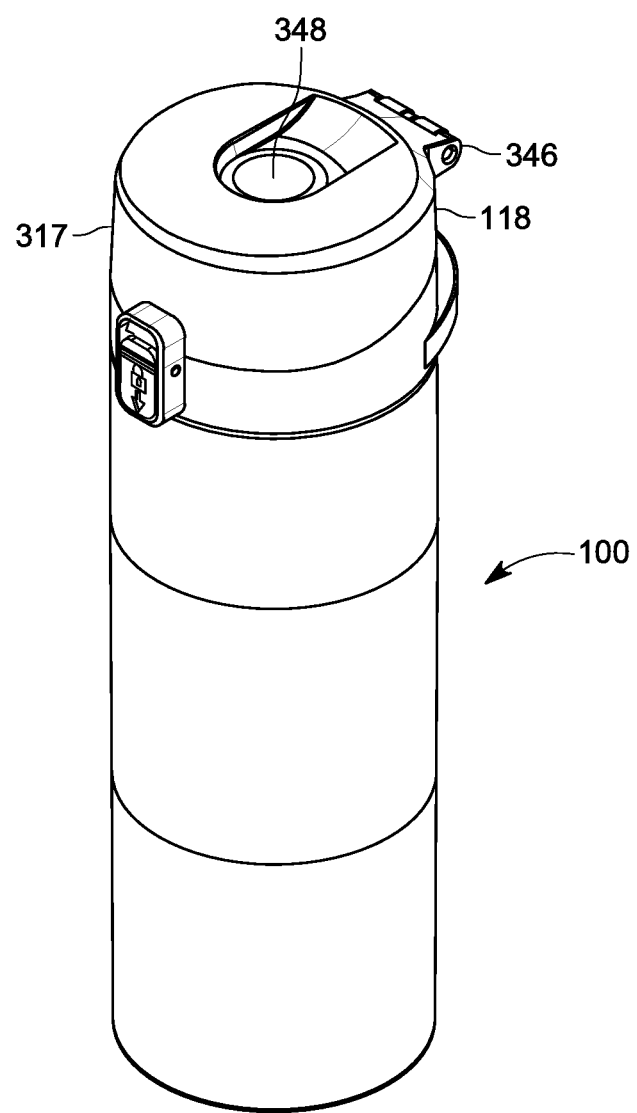
FIG. 10 shows a perspective view of the water treatment system of FIG. 1.
Figure 11:
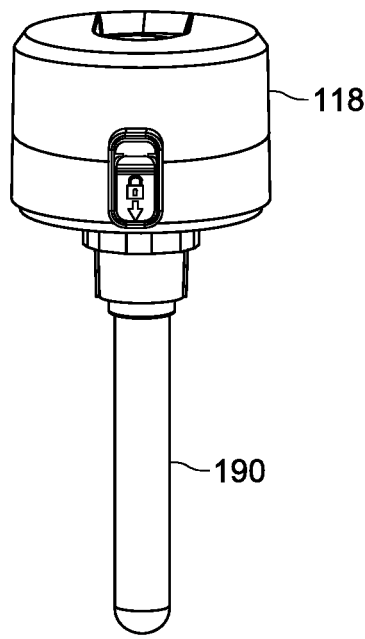
FIG. 11 shows a cap assembly of a water treatment system in accordance with one embodiment.
Figure 12:
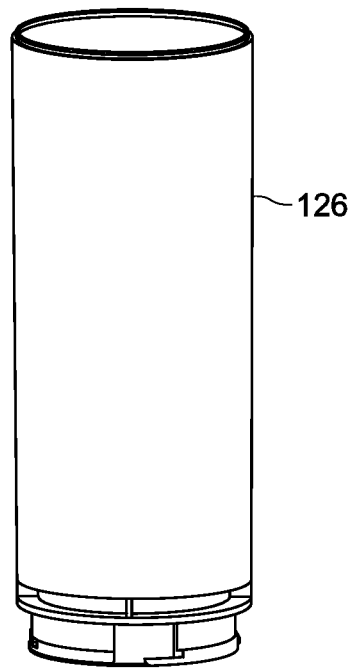
FIG. 12 shows a portion of a treated water reservoir of the water treatment system in accordance with one embodiment.
Figure 13:
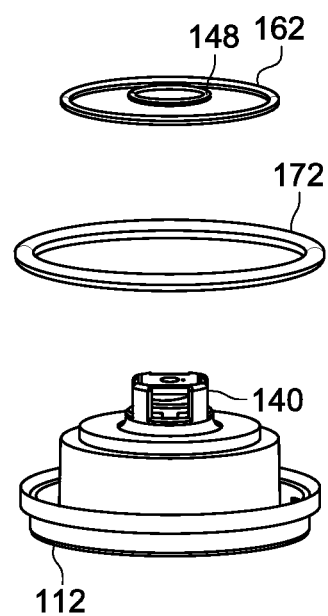
FIG. 13 shows a filter assembly of a water treatment system in accordance with one embodiment.
Figure 14:
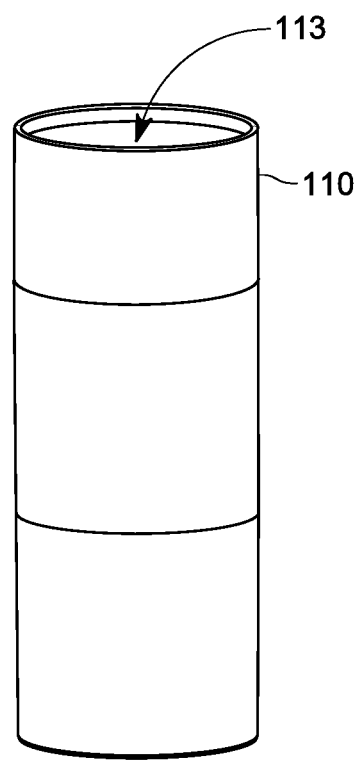
FIG. 14 shows an untreated water reservoir of a water treatment system in accordance with one embodiment.
Figure 15:
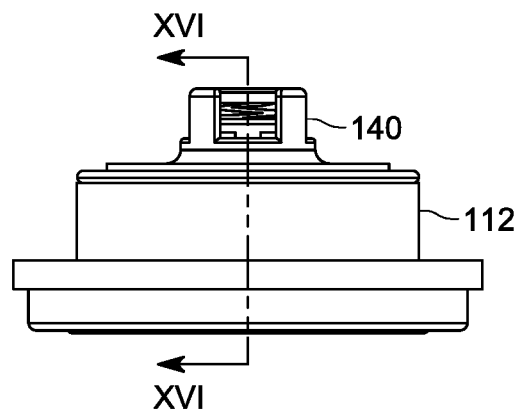
FIG. 15 shows a front view of a filter assembly of the water treatment system in accordance with one embodiment.

The cap assembly 118 in one embodiment of the present disclosure is shown in further detail in FIGS. 6 and 11. The cap assembly 118, as mentioned herein, is part of a UV disinfection system 190. The cap assembly 118 may be configured to removably couple to the treated water reservoir 114. The cap assembly 118 may fluidly seal a first end opening 122 of the treated water reservoir 114 to substantially prevent spillage of treated water from the cavity 121 of the treated water reservoir 114 and enable transfer of treated water from a cavity 121 to a user for consumption. For instance, the cap assembly 118 may include threads that engage corresponding threads provided about the first end opening 122 of the treated water reservoir 114.

The cap assembly 118 in the illustrated embodiment may direct the treatment of water within the water treatment system 100. The cap assembly 118 may be configured to provide access to treated water for consumption by a user.

In the illustrated embodiment, the cap assembly 118 may include a cap 301 configured to couple to the first end opening 122 of the treated water reservoir 114. For instance, the cap 301 may include threads 345 configured to engage corresponding threads of the first end opening 122. With this interface, the cap 301 may couple to the treated water reservoir 114 to form a seal about the perimeter of the first end opening 122.

The cap 301 in the illustrated embodiment may be removed from the treated water reservoir 114 to facilitate access to the cavity 121 of the treated water reservoir 114.

The cap 301 may include a spout 344 having a channel 362 that allows transfer of treated water from the cavity 121 of the treated water reservoir 114 to a user for consumption. The external end of the spout 344 may be sealed by a lid 317, optionally in conjunction with a gasket, to prevent substantial spillage. The lid 317 may rotate about a hinge 346 formed by pin receivers in the lid 317 and pin receivers in the cap 301. The cap 301 may include a latch 302 capable of engaging a catch 303 of the lid 317. A slide mechanism or push mechanism of the latch 302 may be operable by the user to move the latch 302 to release the catch 303 of the lid 317, and allow the lid 317 to pivot about the hinge 346 in order to provide access to the spout 344 for consumption of water from the cavity 121.

It should be understood that the present disclosure is not limited to this hinge construction and that the lid 317 may cooperate to seal the spout 344 of the cap 301 in a variety of ways. Alternatively, a lid 317 may not be present such that the spout 344 may seal in an alternative way, such as by folding of the spout 344 to form a watertight and gas tight seal between the channel 362 of the cap 301 and the surrounding atmosphere.

In the illustrated embodiment, the UV disinfection system 190 may include a UV light source 192 disposed to generate UV light for transmission into the cavity 121 of the treated water reservoir 114. In one embodiment, as mentioned herein, the UV light source 192 may include a cold cathode UV lamp. Alternatively, the UV light source 192 may include a plurality of UV LEDs.

The UV light source 192 in the illustrated embodiment may include a quartz glass cylinder in which a gas is provided. The UV disinfection system 190 may include circuitry capable of exciting the gas to discharge UV light for disinfection purposes.

The UV disinfection system 190 may include one or more physical connectors that provide charging and/or communication capabilities via external connections. External access to these one or more physical connectors may be provided via an aperture (not shown) in the cap 301. As discussed herein, the cap assembly 118 may include a button 348 operable by a user to selectively activate a UV treatment operation with light from the UV light source 192. The UV disinfection circuitry 194 may respond to activation of the button 348 by supplying power to the UV light source 192 for a duration of time. The duration, as discussed herein, may be predetermined or dynamically determined based on sensor input (e.g., dosage, influent amount, and effluent amount for a given time).

In one embodiment, the UV disinfection system 190 may be operable to provide UV light for disinfection purposes to the treated water in response to a user taking water from the water treatment system. This process of disinfection may be implemented in addition to or alternative to batch disinfection with UV light when water is not being consumed. The UV disinfection system 190, in one embodiment, may include a sensor operable to provide sensor output indicative of when water is being consumed, and may activate the UV light in response to a determination that water is being consumed. The sensor in one embodiment may be a level sensor that indicates when the water treatment system 100 is being tipped, which is an indicator of consumption.

III. Filter Assembly

In the illustrated embodiment of FIGS. 2-5, 13, 15-19, and 26, the filter assembly 112 can be seen in further detail. The filter assembly 112 includes a filter assembly connector 130 configured to interface with a connector 136 of the treated water reservoir 114. More specifically, in the illustrated embodiment of FIGS. 23-25, the hollow cylinder 126 includes a connector 136 in the form of a twist lock connector disposed on the exterior surface of the hollow cylinder 126 and in proximity to the second end opening 124. The filter assembly connector 130 may include a twist lock connector configured to mate with the connector 136 of the hollow cylinder 126.

An O-ring gasket 162 may be disposed in proximity to the coupling between the hollow cylinder 126 and the filter assembly 112 to facilitate formation of a substantially water tight and gas tight seal.

The filter assembly 112 may include a treated water outlet 140 and a plurality of untreated water inlets 142. In response to a pressure differential between the treated water outlet 140 and the untreated water inlets 142, water may flow from the untreated water inlets 142 to the treated water outlet 140 through a filter media 144 (e.g., a carbon block filter). Optionally, although not shown, one or more additional filter stages may be incorporated into the filter assembly 112, including a sediment pre-stage filter, such as a screen disposed between the untreated water inlets 142 and the filter media 144. As another example, the filter media 144 may include hollow fiber or a membrane. The untreated water inlets 142 in the illustrated embodiment may form a baffle that distributes the flow of water through the filter media 144. The distribution in one embodiment provided by the baffle may be substantially uniform.

In the illustrated embodiment, the pressure differential between the treated water outlet 140 and the untreated water inlets 142 may be formed at least in part by application of force on the main body 150 into the cavity 120 of the untreated water reservoir 110 in conjunction with the wiping seal interface 170 and the air passage 349. By applying force to the main body 150 into the cavity 120, the wiping seal interface 170 may pressurize the cavity 120 whereas, with the air passage 349, the cavity 121 of the treated water reservoir 114 may remain at a lower pressure than the cavity 120. This pressure differential may direct water through the untreated water inlets 142 of the filter assembly 112 and through the treated water outlet 140 into the cavity 121 of the treated water reservoir 114.

The filter assembly 112 in the illustrated embodiment, as discussed herein, may include a treated water outlet 140. The treated water outlet 140 may correspond to an outlet of a check valve 146 operable to allow water and/or gas to flow through the treated water outlet 140 but not to allow water and/or gas to flow back through the treated water outlet 140 (e.g., from the cavity 121 of the treated water reservoir 114 back through the filter assembly 112). The check valve 146 may prevent treated water in the treated water reservoir 114 from leaking back through the filter assembly 112 into the untreated water reservoir 110. The check valve 146 in the illustrated embodiment may include a flange operable to interface with an O-ring 148 and a surface 145 of the filter assembly 112. The surface 145 may be part of a filter assembly body 147 operable to hold the filter media 144 and the check valve 146. The O-ring 148 may facilitate providing a seal between a downstream side the filter assembly 112 and an upstream side of the filter assembly 112 (e.g., between the cavity 121 of the treated water reservoir 114 in the cavity 120 of the untreated water reservoir 110).

The filter assembly 112 in the illustrated embodiment may include the seal disengagement element 174 described herein. The seal disengagement element 174 may be operable to disengage a surface of the seal 172 to allow removal of the main body 150 from the untreated water reservoir 110. Due at least in part to the check valve 146 of the filter assembly 112 preventing back flow of air and/or gas into the untreated water reservoir 110, if the seal 172 is maintained, removal of the main body 150 from the untreated water reservoir 110 would involve working against a vacuum developed within the cavity 120 of the untreated water reservoir 110. The seal disengagement element 174, by disengaging the seal 172 or breaking the seal between the main body 150 and the untreated water reservoir 110, may substantially prevent formation of such a vacuum within the cavity 120 and allow removal of the main body 150 from the untreated water reservoir 110.

The seal disengagement element 174 in the illustrated embodiment is an annular flange arranged to be proximal to the inner surface 177 of the untreated water reservoir 110. The annular flange may include a finger 173 operable to contact and unseat the seal 172. The finger 173 may be a tapered relative to a main flange portion 179 of the seal disengagement element 174. For instance, the finger 173 may taper from a portion proximal to the main flange portion 179 to a tip 184 or portion distal from the main flange portion 179. The degree of taper or slope may vary from application to application. In the illustrated embodiment of FIG. 5, the finger 173 is constructed with an outer surface 181 that is substantially even with a corresponding outer surface of the main flange portion 179, and an inner surface 182 that is curved from the main flange portion 179 to the tip 184 of the finger 173. The curvature in the illustrated embodiment is circular with a radius corresponding generally with the radius of the seal 172. However, the present disclosure is not limited to a circular curvature. For example, the curvature of the inner surface 182 may be parabolic or elliptical. It is also to be understood that the present disclosure is not limited to the outer surface 181 being substantially even with the outer surface of the main flange portion 179. The outer surface 181 may deviate from the outer surface of the main flange portion 179 to contribute to the taper of the finger 173.

The degree of taper and the length of the finger 173 relative to the main flange portion 179 may vary from application to application.

As described herein, the tip 184 of the finger 173 may be operable to unseat the seal 172. In the illustrated embodiment, the tip 184 may engage the seal 172 to urge the seal away from an inner surface 177 of the untreated water reservoir 110, thereby unseating the seal 172 from the inner surface 177 or at least temporarily breaking an air and water tight seal provided by the seal 172.

Figure 16:
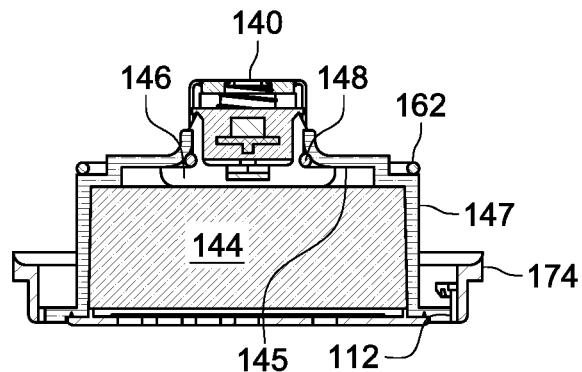
FIG. 16 depicts a sectional view of the filter assembly of FIG. 15.
Figure 17:
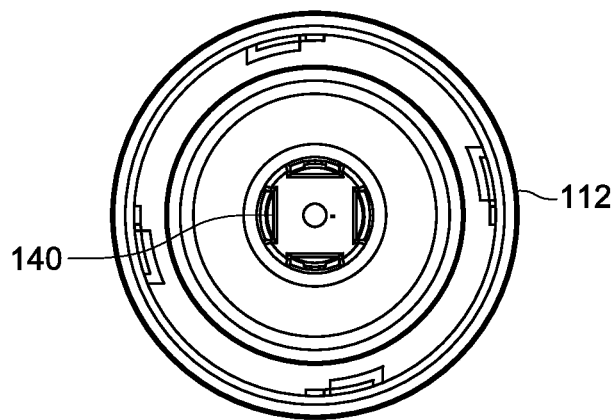
FIG. 17 shows a top view of the filter assembly of FIG. 15.
Figure 18:
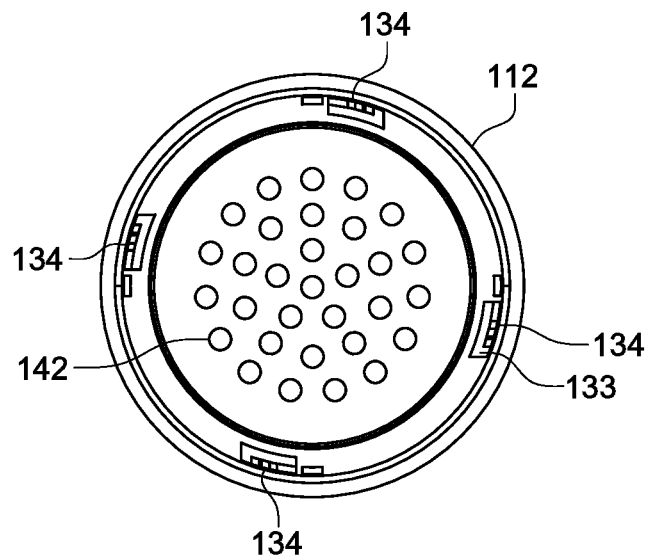
FIG. 18 shows a bottom view of the filter assembly of FIG. 15.
Figure 19:
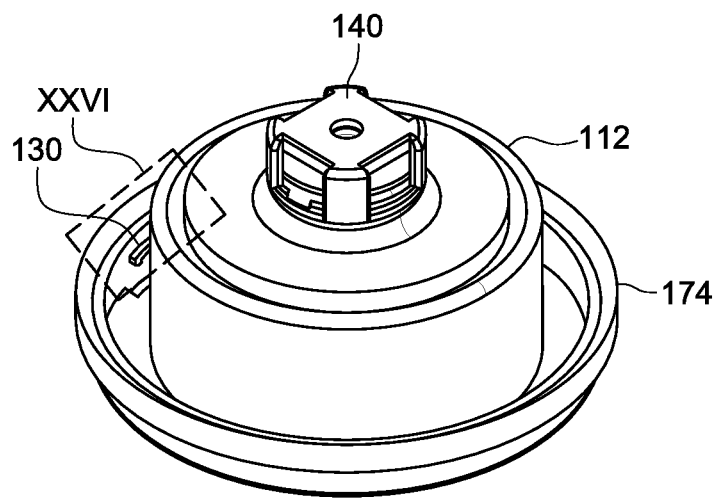
FIG. 19 shows a perspective view of the filter assembly of FIG. 15.
Figure 20:
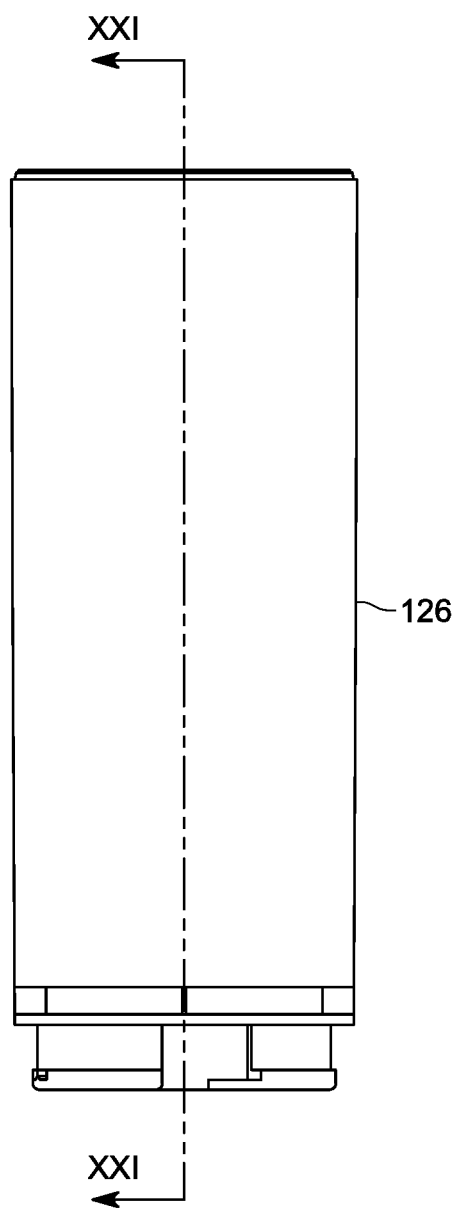
FIG. 20 shows a front view of a portion of the treated water reservoir in accordance with one embodiment.
Figure 21:
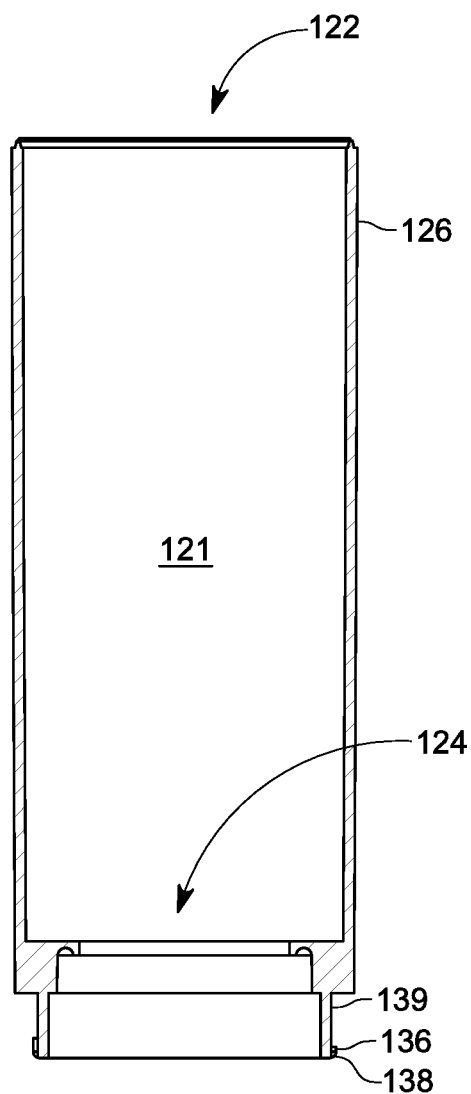
FIG. 21 shows a sectional view of the portion in FIG. 20.
Figure 22:
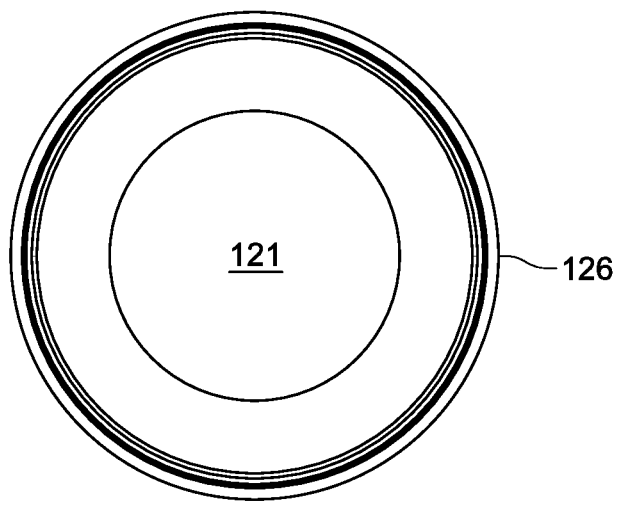
FIG. 22 shows a top view of the portion in FIG. 20.
Figure 23:
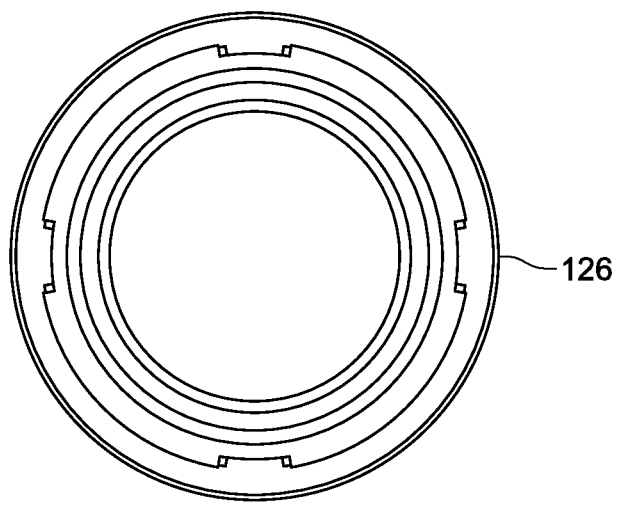
FIG. 23 shows a bottom view of the portion in FIG. 20.
Figure 24:
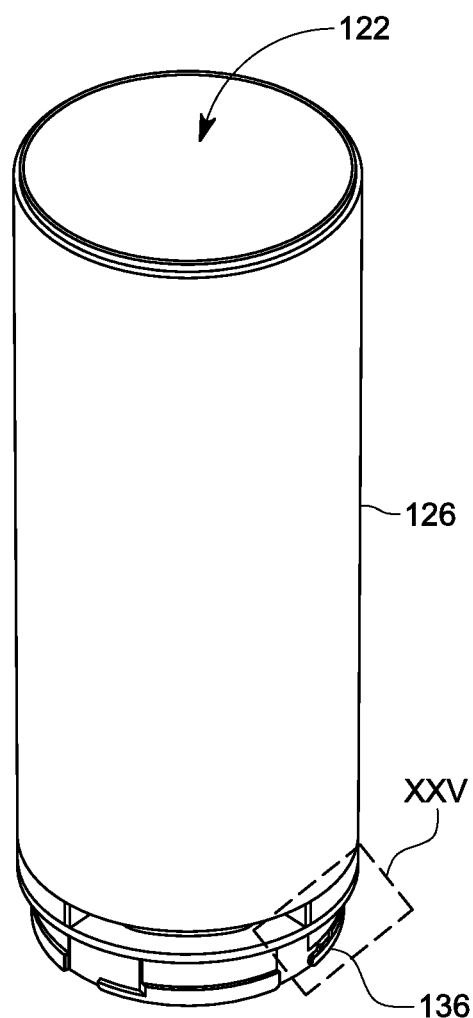
FIG. 24 shows a perspective view of the portion in FIG. 20.

In the illustrated embodiment of FIGS. 16 and 19, the seal disengagement element 174 is disposed about the entire perimeter of the filter assembly 112. It is noted that the seal disengagement element 174 may be configured differently. In one embodiment, the seal disengagement element 174 or a portion thereof may be segmented in one or more separate parts about the perimeter of the filter assembly 112. The main flange portion 179 and/or the finger 173 may be segmented. As an example, the main flange portion 179 may be disposed about the entire perimeter of the filter assembly 112, and four fingers 173 may be provided that are spaced apart around the perimeter of the main flange portion 179.

The filter assembly 112 in one embodiment of the present disclosure may be operable to connect to the treated water reservoir 114 via connection of the filter assembly connector 130 to the connector 136 of the hollow cylinder 126. The connector 136 and the filter assembly connector 130 are shown in further detail in the illustrated embodiment of FIGS. 18-19, 21, and 24-26.

Figure 25:
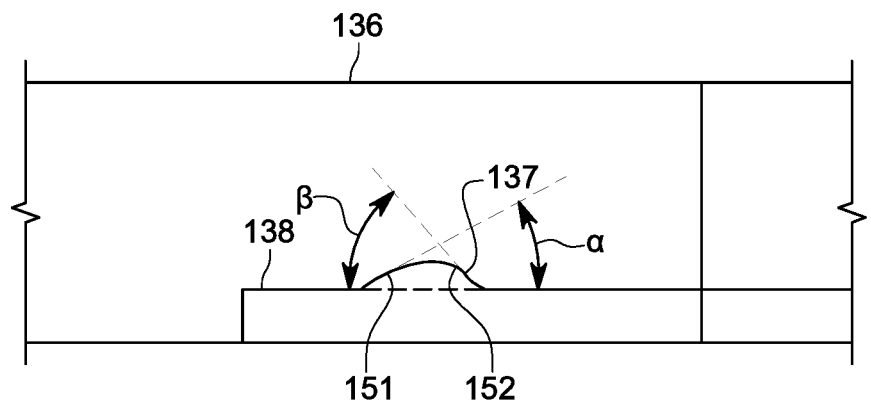
FIG. 25 shows a partial view of a connector of the portion in FIG. 20.
Figure 26:
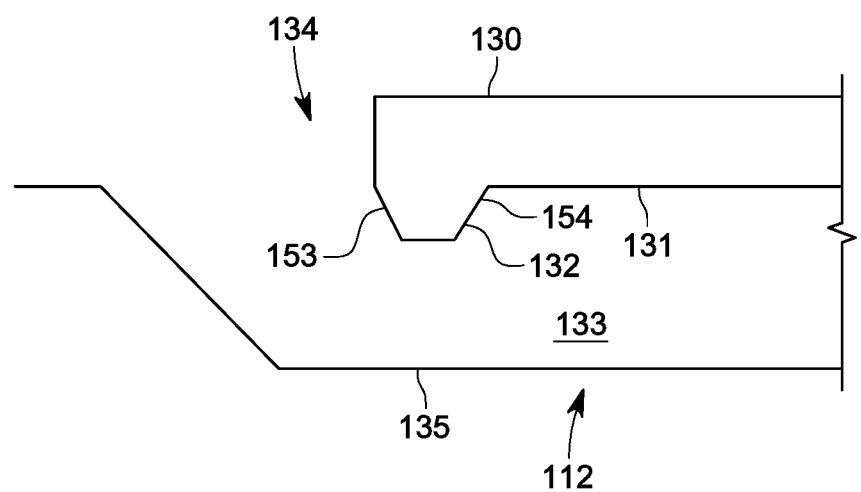
FIG. 26 shows a partial view of a connector of the filter assembly in FIG. 19.

The filter assembly connector 130 of the filter assembly 112 may include a plurality of connector receivers 134 spaced annularly near a perimeter of the filter assembly 112. The connector receivers 134 may include a recess 133 with a flexible arm 131 having a filter assembly projection 132 that extends toward a surface 135 of the filter assembly connector 130. The filter assembly projection 132 in conjunction with the surface 135 may be operable to engage and hold in position a main body projection 137 of a ledge 138 that protrudes from an outer surface 139 of the treated water reservoir 114. The main body projection 137 in the illustrated embodiment of FIG. 25 is provided on a side of the treated water reservoir 114 that is opposite the side of the connector receiver 134 of the filter assembly 112 shown in FIG. 26. As a result, it is noted that the main body projection 137, in engaging the flexible arm 131 and the filter assembly projection 132, may slide into the recess 133, such that the leading surface 151 of the main body projection 137 engages the leading surface 153 of the filter assembly projection 132, bending the flexible arm 131 to allow the filter assembly projection 132 to slide past the trailing surface 154 of the main body projection 137. This engagement of the connector receiver 134 with the main body projection 137 and ledge 138 of the treated water reservoir 114 may be achieved via rotation of the filter assembly 112 in a clockwise manner relative to the treated water reservoir 114.

Disengagement of the filter assembly 112 may be achieved via rotation of the filter assembly 112 in a counterclockwise manner relative to the treated water reservoir 114. Such rotation may cause the trailing surface 154 of the main body projection 137 to engage and slide past the trailing surface 154 of the filter assembly projection 132. After the main body projection 137 has slid past the leading surface 153 of the filter assembly projection 132, the filter assembly 112 may be separated from the treated water reservoir 114. This engagement construction of the filter assembly 112 with respect to the treated water reservoir 114 may provide a type of twist lock connection between the filter assembly 112 and the treated water reservoir 114

In the illustrated embodiment, the engagement force and the disengagement force for the main body projection 137 within the connector receiver 134 may be different. The leading surface 151 of the main body projection 137 may be sloped at an angle α that is less than an angle β of the trailing surface 152 of the main body projection 137. As a result, the leading surface 151 may more easily slide past the filter assembly projection 132 to engage the main body projection 137 within the connector receiver 134 relative to sliding the trailing surface 152 past the filter assembly projection 132 for disengagement of the main body projection 137 from within the connector receiver 134. The greater the angle β the more force needed to disengage the filter assembly 112 from the treated water reservoir 114. Likewise, the less the angle β the easier it is to disengage the filter assembly 112 from the treated water reservoir 114. The greater the angle α the more force needed to engage the filter assembly 112 with the treated water reservoir 114, the less the angle α the easier it is to engage the filter assembly 112 with the treated water reservoir 114.

The difference in force for engagement versus disengagement may enable the filter assembly 112 to be easily connected to the treated water reservoir 114 by a user. It is noted, however, that removal of the main body 150 from the untreated water reservoir 110 by a user may involve, in some cases, the user twisting or rotating the main body 150 relative to the untreated water reservoir 110. If the threshold force for disengagement of the filter assembly 112 from the treated water reservoir 114 is insufficient, such rotation of the main body 150 may cause the filter assembly 112 to disengage from the treated water reservoir 114 and remain within the untreated water reservoir 110. In other words, if the threshold force for disengagement is insufficient, rotation of the main body 150 may cause separation of the filter assembly 112 from the treated water reservoir 114 and leave the filter assembly 112 within the untreated water reservoir 110. If the filter assembly 112 is left within the untreated water reservoir 110, the user may need to use a tool to pull the filter assembly 112 out of the untreated water reservoir 110. By increasing the angle β and thereby increasing the threshold force for disengagement of the filter assembly 112, disengagement of the filter assembly 112 while a user attempts to remove the main body 150 from the untreated water reservoir 110 may be substantially avoided. The angle β may be determined to make the threshold force for disengagement sufficiently large to avoid inadvertently disengaging the filter assembly 112 from the treated water reservoir 114. To allow the user to more easily connect the filter assembly 112 to the treated water reservoir 114, the angle α may be selected to be less than the angle β.

IV. Wiping Seal

In the illustrated embodiments of FIGS. 2-5, the water treatment system 100 is shown in further detail in conjunction with a treatment operation. A cross-section of the water treatment system 100 is shown in FIGS. 2-5 with a wiping seal interface 170. The wiping seal interface 170 in the illustrated embodiment may facilitate formation of a pressure differential between the untreated water reservoir 110 and the treated water reservoir 114 via application of force to the main body 150. As described herein, the main body 150 may be plunged via application of force into the untreated water reservoir 110. This plunging effort in conjunction with the wiping seal interface 170 may direct water through the filter assembly 112.

In an alternative embodiment, the main body 150 may be forced into the untreated water reservoir 110 via application of at least one of a vacuum or a threaded surface of the inner surface 177. For instance, the untreated water reservoir 110 may form a threaded sleeve with threading on the inner surface 177 that interfaces with threads of the main body 150. The threaded arrangement may be used to force the main body 150 into the cavity 120 of the untreated water reservoir, such that the wiping seal moves both rotationally and longitudinally with respect to the untreated water reservoir 110.

It is noted that by using force to move the main body 150 into the cavity 120 of the untreated water reservoir 110, treatment of the untreated water 400 can be conducted in a manner faster than would otherwise occur if gravity were used to direct the untreated water 400 through the filter assembly 112. It is to be understood that a gravity based configuration may be provided in an alternative embodiment.

In the illustrated embodiment, the wiping seal interface 170 is provided between the main body 150 and the inner surface 177 of untreated water reservoir 110. The wiping seal interface 170 in the illustrated embodiment may include a seal 172. The seal 172 may be an O-ring, such as a Nitrile (Buna-N) O-ring suitable for use with water and abrasive resistant. Additional examples of the seal 172 include a quad ring and a ribbed gasket. The ribbed gasket may be constructed to adapt to changing surface finishes to facilitate maintenance of the seal. The shape of the seal 172 may vary from application to application. For instance, in the illustrated embodiment, the seal 172 is circular but the seal 172 may be elliptical.

The wiping seal interface 170 in the illustrated embodiment is configured to allow the seal 172 to move laterally, at least partially, relative to a longitudinal axis 111 of the water treatment system 100. For instance, the seal 172 may be spaced away from an outer surface 178 of the main body 150, but configured to move toward the outer surface 178 in response to being unseated by the seal disengagement element 174. Alternatively, the seal 172 may be in contact with the outer surface 178 but configured such that a sealing surface 176 of the seal 172 is operable to move toward the outer surface 178 in response to being unseated by the seal disengagement element 174. Examples of this alternative embodiment include a seal 172 sized and shaped to contact by the outer surface 178 and the inner surface 177. The shape may be circular, similar to the circular shape of the seal 172 in FIG. 5; however, the present disclosure is not so limited. The shape and configuration of the seal 172 may be different depending on the application. For instance, the shape may be elliptical, or the seal 172 may include a fixed portion in contact with the outer surface 178 and a movable portion capable of interfacing with the inner surface 177, with a flexible link between the fixed portion and the movable portion. The flexible link and the movable portion may be configured to urge the sealing surface 176 against the inner surface 177 to facilitate formation of an air and water tight seal between the main body 150 and the untreated water reservoir 110.

The seal 172 in the illustrated embodiment is sized such that a diameter of the sealing surface 176 is greater than the diameter of the inner surface 177. This difference in diameter is depicted for purposes of disclosure with the seal 172 overlapping the inner surface 177. In practice, the seal 172 is deformed to contact the inner surface 177 such that the sealing surface 176 is in contact with the inner surface 177. As discussed herein, the seal 172 may be shaped in a variety of ways, and may not include a circular cross section. Additionally, it is noted that the main body 150 and the untreated water reservoir 110 may not be circularly shaped. For example, the main body 150 and the untreated water reservoir 110 may have a square-shaped cross section or an elliptical-shaped cross section. The shape of the seal 172 about the longitudinal axis 111 may correspond to the cross sectional shape of the main body 150 and be sized such that the sealing surface 176 contacts the inner surface 177 of the untreated water reservoir 110 to facilitate formation of an air and water tight seal between the untreated water reservoir 110 and the main body 150.

In the illustrated embodiment, the wiping seal interface 170 may be configured to allow the seal 172 to move parallel to the longitudinal axis 111 of the water treatment system 100. As shown in FIG. 5, the space between the seal disengagement element 174 and a seal engagement surface 171 of the main body 150 may be larger than the seal 172 to allow the seal 172 to move therebetween. For instance, prior to the main body 150 being plunged into the untreated water reservoir 110, the seal 172 may be positioned similar to the position shown in solid lines in FIG. 5 (except the seal 172 would not overlap the finger 173 as shown). As the main body 150 is plunged into the untreated water reservoir 110, the seal 172 may displace vertically along the longitudinal axis 111 of the water treatment system 100 until the seal 172 engages the seal engagement surface 171 of the main body 150 as shown in phantom lines in FIG. 5. Optionally, the seal engagement surface 171 may be angled (e.g., as shown by phantom line 185) to form a wedge-shaped void between the seal engagement surface 171 and the inner surface 177. The wedge shaped void may be operable to deform the seal 172 and urge it toward the inner surface 177, thereby tightening the air and water tight seal between the seal engagement surface 171, the inner surface 177 and the seal 172, as the user pushes the main body 150 into the cavity 120 of the untreated water reservoir 110.

Additionally, as shown in phantom lines in FIG. 5, the seal 172 may deform to engage the inner surface 177 of the untreated water reservoir 110 in response to plunging the main body 150 into the untreated water reservoir 110. The seal 172 in the position shown in phantom lines in FIG. 5 may be operable to provide an air and water tight seal between the surrounding environment 180 and the cavity 120 of the untreated water reservoir 110, thereby generating pressure within the cavity 120 in response to application of force between the main body 150 and the untreated water reservoir 110 along the longitudinal axis 111. The sealing surface 176 in this configuration may slide across the inner surface 177, while maintaining an air and water tight seal therewith, as the main body 150 is plunged into the untreated water reservoir 110.

The wiping seal interface 170 as described herein may facilitate disengagement of the seal 172 to substantially avoid formation of a vacuum within the cavity 120 of the untreated water reservoir 110 as a user attempts to remove the main body 150 from the untreated water reservoir 110. With the seal 172 in a position similar to the position shown in phantom lines in FIG. 5, as the main body 150 is pulled by a user from the untreated water reservoir 110, the seal 172 may remain largely stationary relative to the seal disengagement element 174 and the seal engagement surface 171. As the main body 150 is pulled from the untreated water reservoir 110, prior to the seal 172 being unseated, the seal engagement surface 171 may move away from the seal 172 while the seal disengagement element 174 moves into proximity to the seal 172. The tip 184 of the finger 173 may engage the seal 172 proximal to the sealing surface 176 of the seal 172 to disengage the sealing surface 176 from the inner surface 177, thereby unseating the seal 172. In other words, the finger 173 of the seal disengagement element 174 may peel the seal 172 away from the inner surface 177 of the untreated water reservoir 110 to at least temporarily break the air and water tight seal between the surrounding environment 180 and the cavity 120 of the untreated water reservoir 110.

In the illustrated embodiment, the inner surface 177 of the untreated water reservoir 110 may not be parallel to the longitudinal axis 111 of the water treatment system 100. The inner surface 177 may be closer to the longitudinal axis 111 near a lower portion of the untreated water reservoir 110 than near the opening 113 of the untreated water reservoir 110. The difference in distance between these two points relative to the longitudinal axis 111 may vary from application to application. In the illustrated embodiment, the difference is approximately 2 mm, with the distance between the inner surface 177 and the longitudinal axis 111 near the opening 113 being 2 mm greater than the distance between the inner surface 177 and the longitudinal axis 111 near the lower portion of the untreated water reservoir 110 (e.g., a portion opposite the opening 113). The difference in distance may allow a user to insert the main body 150 into the untreated water reservoir more easily at first, and then the wiping seal interface 170 may gradually engage the seal 172 more and more as the main body 150 is plunged farther and farther into the cavity 120 of the untreated water reservoir 110. The difference in distance may result in the engagement between the inner surface 177 and the seal 172 being more close or tighter near the lower portion of the untreated water reservoir 110 than near the opening 113. Additionally, it is noted that the difference in distance between the upper and lower parts of the inner surface 177 relative to the longitudinal axis 111 may facilitate disengagement of the seal 172. As the main body 150 is pulled from the untreated water reservoir 110, as the seal 172 moves closer to the opening 113 or upper part of the inner surface, the increase in diameter of the inner surface 177 due to the increasing distance between the inner surface 177 and the longitudinal axis 111 may decrease the effectiveness of the seal 172 and perhaps result in the possibility of no contact between the sealing surface 176 and the inner surface 177. For instance, above the halfway distance or the ⅔ mark between the opening 113 and the lower portion of the untreated water reservoir 110, the diameter of the inner surface 177 may be greater than the diameter of the sealing surface 176 of the seal 172.

As described herein, the finger 173 of the seal disengagement element 174 may be tapered from the main flange portion 179 to the tip 184 of the finger 173. The tip 184 may insert between the seal 172 and the inner surface 177, with the taper causing displacement of the seal 172 laterally relative to the longitudinal axis 111 away from the inner surface 177 until the air and water tight seal with the inner surface 177 is broken. In this way, the finger 173, in response to being moved vertically along the longitudinal axis 111, may facilitate unseating the seal 172 and facilitate removal of the main body 150 from the untreated water reservoir 110. The degree of taper (e.g., the angle, slope, or curvature) of the finger 173 may affect initial engagement of the tip 184 and the amount of vertical movement of the seal disengagement element 174 to unseat the seal 172.

In the illustrated embodiment of FIG. 5, the seal 172 is shown overlapping the finger 173, including the tip 184, for purposes of disclosure to illustrate that position of the tip 184 relative to the center 175 and the sealing surface 176 of the seal 172. The position of the tip 184 may be provided between the center 175 and the sealing surface 176 in its undeformed state as shown in FIG. 5. For instance, if the seal 172 were shown in a deformed state, the actual position of the center 175 relative to the tip 184 may be less apparent. In the illustrated embodiment, with the tip 184 disposed between the center 175 and the sealing surface 176, the tip 184 is operable to facilitate peeling the seal 172 away from the inner surface 177 or in other words, to facilitate unseating the seal 172. If the tip 184 were disposed on the opposite side of the center 175, the tip 184 may not effectively insert between the sealing surface 176 and the inner surface 177 to facilitate unseating the seal 172. Additionally, if the tip 184 were disposed to the right of the sealing surface 176 in FIG. 5, the tip 184 may facilitate effectively unseating the seal 172; however, the effectiveness of the seal 172 may be adversely affected by this positioning of the tip 184 because this position may cause an increase in potential distance between the sealing surface 176 and the inner surface 177.

The wiping seal interface 170 may facilitate treatment of water in accordance with one embodiment. In the illustrated embodiment of FIG. 2, the water treatment system 100 is depicted with the untreated water reservoir 110 having been filled with untreated water 400. A user may insert the main body 150 into the cavity 120 of the untreated water reservoir 110 such that the wiping seal interface 170 engages between the inner surface 177 of the untreated water reservoir 110 and the seal engagement surface 171 of the main body 150, as shown in phantom lines in FIG. 5.

With the wiping seal interface 170 engaged, the untreated water 400 as well as any remaining gas present in the cavity 120 of the untreated water reservoir 110 may be prevented from flowing through the wiping seal interface 170 into the surrounding environment 180 (e.g., the surrounding atmosphere). At this stage, the untreated water 400 as well as any remaining gas may flow substantially only through the filter assembly 112 into the cavity 121 of the treated water reservoir 114. The user may apply force to the main body 150 to plunge into the cavity 120 of the untreated water reservoir 110, thereby directing the untreated water 400 through the filter assembly 112 into the cavity 121 of the treated water reservoir. The fluids and gases within the cavity 120 may traverse through the filter assembly 112 in an effort to equalize the pressure differential, thereby resulting in displacement of the main body 150 into the cavity 120 of the untreated water reservoir 110.

Traversal of the untreated water 400 through the filter assembly 112 may result in treatment or removal of one or more contaminants from the untreated water 400 such that the filter assembly 112 discharges treated water 410 into the cavity 121 of the treated water reservoir 114. This traversal of the untreated water 400 can be seen in the illustrated embodiment of FIG. 3, with the main body 150 being displaced further into the cavity 120 of the untreated water reservoir 110 relative to the position of the main body 150 in the illustrated embodiment of FIG. 2. Ultimately the main body 150 may seat fully into the cavity 120 of the untreated water reservoir 110.

In one embodiment, a water treatment procedure may include the following steps. First, the outer bottle may be filled to a line specified in the cavity 120 of the untreated water reservoir 110 with water from any municipal water source. Next, the main body 150 may be placed, with the filter assembly 112, into the cavity 120 of the untreated water reservoir 110.

A seal 172 as part of the wiping seal interface 170 may be configured to seal the outside of the main body 150 relative to the inner surface 177 of the untreated water reservoir 110. The movement of the main body 150 through the untreated water 400 in the untreated water reservoir 110 may be achieved by plunging the main body 150 into the cavity 121, thus causing the untreated water 400 in the untreated water reservoir 110 to move through the filter assembly 112 by means of a pressure drop from atmosphere pressure in the untreated water reservoir 110 to low pressure provided via the air passage 349, through which air within the cavity 121 may be discharged as treated water 410 enters the cavity 121.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s). The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A water treatment system comprising:
   an untreated water reservoir having a cavity capable of holding untreated water;
   a main body comprising a filter assembly and a treated water reservoir;
   the filter assembly adapted to be disposed within the cavity of the untreated water reservoir, the filter assembly including an inlet configured to be fluidly coupled with the cavity to receive the untreated water, the filter assembly including an outlet configured to discharge treated water;

the treated water reservoir configured to store treated water discharged from the filter assembly, the treated water reservoir including a first end opening and second end opening, the second end opening of the treated water reservoir being fluidly coupled with the outlet of the filter assembly;

a wiping seal interface including a seal between a seal engagement surface of the main body and an inner surface of the untreated water reservoir;

wherein the seal of the wiping seal interface provides a substantially air and water tight seal between an environment and the cavity of the untreated water reservoir, wherein displacing the main body into the cavity of the untreated water reservoir directs the untreated water through the filter assembly into the treated water reservoir; and wherein the wiping seal interface includes a seal disengagement element operable to contact and unseat the seal to break the substantially air and water tight seal based on movement of the main body out of the cavity of the untreated water reservoir.

2. The water treatment system of claim 1 wherein the main body includes a cap assembly operable to engage the first end opening of the treated water reservoir.

3. The water treatment system of claim 2 wherein the cap assembly includes a spout in fluid communication with the treated water reservoir to provide the treated water to a user for consumption.

4. The water treatment system of claim 2 wherein the cap assembly includes an air passage that substantially equalizes a pressure in the treated water reservoir with the environment, wherein the wiping seal interface is operable to generate a pressure differential between the treated water reservoir and the untreated water reservoir in order to direct the untreated water through the filter assembly.

5. The water treatment system of claim 2 wherein the cap assembly includes a UV treatment system with a UV light source for disinfecting water.

6. The water treatment system of claim 1 wherein the filter assembly and the treated water reservoir are operable to connect via a twist lock connection.

7. The water treatment system of claim 6 wherein the twist lock connection is configured to substantially prevent the filter assembly from disengaging from the treated water reservoir within the cavity of the untreated water reservoir in response to rotation of the main body relative to the untreated water reservoir.

8. The water treatment system of claim 1 wherein the seal disengagement element includes a finger operable to pry the seal from the inner surface of the cavity of the untreated water reservoir in order to unseat the seal.

9. The water treatment system of claim 1 wherein the seal disengagement element includes a tapered finger operable to unseat the seal from the inner surface of the cavity of the untreated water reservoir in response to manual effort to separate the main body from the untreated water reservoir.

10. The water treatment system of claim 9 wherein the manual effort involves a user applying force along a longitudinal axis of the water treatment system to separate the main body from the untreated water reservoir.

11. The water treatment system of claim 9 wherein the tapered finger includes a tip that is operable to slide between the seal and the inner surface.

12. The water treatment system of claim 11 wherein the tip is disposed to engage the seal between a seal contacting surface of the seal and a center of the seal.

13. The water treatment system of claim 1 wherein the filter assembly includes a check valve operable to allow water to flow into the treated water reservoir and operable to substantially prevent water from flowing from the treated water reservoir into the untreated water reservoir.

14. The water treatment system of claim 13 wherein the wiping seal interface is operable to avoid formation of a substantial vacuum within the untreated water reservoir in response to effort to remove the main body from the untreated water reservoir.

15. A water treatment system comprising:
an untreated water reservoir having a cavity capable of holding untreated water;
a filter assembly adapted to fit within the cavity of the untreated water reservoir, the filter assembly including an inlet configured to be fluidly coupled with the cavity to receive the untreated water, the filter assembly including an outlet configured to discharge treated water;
a treated water reservoir adapted to fit within the untreated water reservoir and configured to store treated water, the treated water reservoir being fluidly coupled with the outlet of the filter assembly;
a wiping seal interface positioned between respective surfaces of the untreated and treated water reservoirs and operable to facilitate generating a pressure differential to direct untreated water through the filter assembly;
a cap having a spout for discharging the treated water stored in the treated water reservoir for consumption by a user, the cap having an air passage to a surrounding environment, the air passage and the wiping seal interface configured to facilitate generation of the pressure differential between the untreated water reservoir and the treated water reservoir such that the untreated water in the cavity of the untreated water reservoir flows through the filter assembly to the treated water reservoir;
wherein the wiping seal interface is operable to break a seal between the surrounding environment and the cavity of the untreated water reservoir to facilitate removal of the filter assembly and the treated water reservoir from the cavity of the untreated water reservoir; and
wherein the wiping seal interface includes a seal element and a seal disengagement element operable to contact and unseat the seal element based on longitudinal movement of the seal disengagement element relative to the seal element.

16. The water treatment system of claim 15 wherein the seal disengagement element is disposed on the filter assembly, wherein longitudinal movement of the filter assembly to remove the filter assembly from the untreated water reservoir urges the seal disengagement element to unseat the seal.

17. The water treatment system of claim 15 wherein the cap includes a UV treatment assembly with a UV light source.

18. A water treatment system comprising:
an untreated water reservoir having a cavity capable of holding untreated water;
a main body comprising:
a filter assembly adapted to fit within the cavity of the untreated water reservoir, the filter assembly including an inlet configured to be fluidly coupled with the cavity to receive the untreated water, the filter assembly including an outlet configured to discharge treated water;

a treated water reservoir configured to store treated water, the treated water reservoir being fluidly coupled with the outlet of the filter assembly;

a cap having a spout for discharging the treated water stored in the treated water reservoir for consumption by a user, the cap including a UV treatment assembly with a UV light source for disinfecting water;

a wiping seal interface between the main body and an inner surface of the untreated water reservoir, the wiping seal interface including a seal element operable to provide a substantially air and water tight seal between a surrounding environment and the cavity of the untreated water reservoir, the wiping seal interface including a seal disengagement element operable to contact the seal element and break the substantially air and water tight seal based on longitudinal movement of the filter assembly relative to the untreated water reservoir;

wherein the untreated water reservoir is configured to receive a least a portion of the main body within the cavity of the untreated water reservoir; and wherein the untreated water in the untreated water reservoir passes through the filter assembly into the treated water reservoir to allow displacement of the main body into the cavity of the untreated water reservoir.

19. The water treatment system of claim 18 wherein the cap includes an air passage operable to equalize pressure in the treated water reservoir with the surrounding environment, whereby the wiping seal interface is operable to provide a pressure differential between the treated water reservoir and the untreated water reservoir in order to direct the untreated water into the treated water reservoir.

* * * * *